United States Patent [19]

Ismail et al.

[11] Patent Number: 5,792,951
[45] Date of Patent: *Aug. 11, 1998

[54] MEASUREMENT SYSTEM WITH SELF CALIBRATING PROBE

[75] Inventors: Raouf A. Ismail, Concord, Mass.; Rajesh M. Nair, Nashua, N.H.

[73] Assignee: Cambridge AccuSense, Inc., Shirley, Mass.

[*] Notice: The term of this patent shall not extend beyond the expiration date of Pat. No. 5,511,415.

[21] Appl. No.: 572,895

[22] Filed: Dec. 18, 1995

Related U.S. Application Data

[63] Continuation-in-part of Ser. No. 182,654, Jan. 18, 1994, Pat. No. 5,511,415.

[51] Int. Cl.$^6$ .................................................. G01F 1/68
[52] U.S. Cl. ........................................ 73/204.11; 374/142
[58] Field of Search ..................... 73/204.11, 204.19, 73/204.22, 861.65, 861.66; 374/142, 40, 41

[56] References Cited

U.S. PATENT DOCUMENTS

| | | | |
|---|---|---|---|
| 4,503,707 | 3/1985 | Rosa et al. | 374/142 |
| 4,548,516 | 10/1985 | Helenowski | 73/204.11 |

Primary Examiner—Sandra L. O'Shea
Assistant Examiner—Harshad Patel
Attorney, Agent, or Firm—Tandiorio & Teska

[57] ABSTRACT

A measurement system including a plurality of self calibrating probes. Each probe has a sensor for providing a signal related to a physical parameter to be measured, and a connector for interfacing the sensor with a monitor. The connector includes a memory device for storing calibration data unique to the sensor. A cable interconnects the sensor with the connector. The monitor of the system includes a microprocessor for polling the storage device on the probe to extract the calibration data, and a software routine which converts the signal provided by the sensor into a calibrated signal and applies the extracted calibration data to the signal provided by the sensor.

6 Claims, 4 Drawing Sheets

1

MEASUREMENT SYSTEM WITH SELF CALIBRATING PROBE

RELATED APPLICATION

This application is a continuation-in-part application of Ser. No. 08/182,654 filed Jan. 18, 1994, now U.S. Pat. No. 5,511,415.

FIELD OF INVENTION

This invention relates to a measurement system which incorporates one or more fully interchangeable probes having one or more transducers. The signal or signals from the transducers are converted into a form to provide a readout understandable by the user.

BACKGROUND OF INVENTION

There are a number of devices which incorporate transducer type probes plugged into a monitor device which processes the signal from the transducer and provides a readout understandable by the user: air flow monitors, ultrasound fetal monitors, EKG monitors, thermal anemometers, fluid flow velocity measurement systems, hygrometry probes, and the like. Such devices generally measure physical parameters such as temperature, fluid flow velocity, etc.

One problem with these types of devices is that they must be calibrated before use because of manufacturing differences between one transducer and another. For example, a thermistor in one probe may indicate a voltage $V_1$ when subjected to a temperature $T_1$ while another thermistor in another probe may indicate a voltage $V_2$ when subjected to the same temperature $T_1$.

So, the probes are calibrated prior to use. One manufacturer of an air flow measurement system provides the user with a diskette containing all the calibration coefficients for each probe manufactured by serial number. The user connects one or more probes to the monitor, enters the serial numbers and location of those probes, and then a routine automatically calibrates the monitor.

Another older method is to subject the individual probes to known conditions, read the signal provided by the probe, and adjust the monitor until it displays the "correct" reading. See U.S. Pat. No. 4,537,068, column 13, line 64 through column 14, line 6. Some devices even come with their own calibration equipment. See, for example, the "calibrator" described in conjunction with the fluid (blood) flow velocity measuring device described in U.S. Pat. No. 3,595,079.

The problem with these prior art methodologies is that the individual probes must be calibrated before they are used and, although trained engineers may be able to accomplish this task fairly accurately, technicians and other users may fail to calibrate the device or fail to calibrate the device correctly. Worse, in units with many probes and/or interchangeable probes, the disadvantage lies in the time involved in calibrating the unit each time a probe is added, removed, or replaced. For example, in the case of the air flow measurement system described above, each time a new probe is used, or probes are interchanged or moved, the calibration diskette must be loaded and the calibration routine run again. In the case of the blood flow velocity measuring device of U.S. Pat. No. 3,595,079, the "calibrator" must be used by trained personnel to calibrate the device each time a new probe is used on a new patient by a physician.

SUMMARY OF INVENTION: I

It is therefore an object of this invention to provide a physical parameter measurement system with fully interchangeable probes.

It is a further object of this invention to provide such a physical parameter measurement system which does not need to be calibrated by the user before use.

It is a further object of this invention to provide such a physical parameter measurement system which is efficient to use since calibration routines and calibration procedures need not be completed before use or when probes are added, removed, or interchanged.

It is a further object of this invention to provide such a physical parameter measurement system which does not require any specialized training before use.

It is a further object of this invention to provide such a physical parameter measurement system which does not require a separate calibration device.

It is a further object of this invention to provide such a physical parameter measurement system which features fully interchangeable probes.

This invention results from the realization that the labor intensive task of calibrating probes each time they are removed, replaced, or interchanged can be eliminated by storing the calibration data unique to each probe right on each probe and then using the probe monitor to poll each probe for its calibration data to calibrate the probe signal during use of the probe so that probes can be added, removed, interchanged, and disposed of without having to recalibrate the monitor. The result is self calibrating probes which means fully interchangeable probes which themselves have the information required to calibrate each probe during use.

This invention features and may suitably comprise or include a measurement system. There are a plurality of self calibrating probes each including: a sensor for providing a signal related to a physical parameter to be measured, and a connector for interfacing the sensor with a monitor. The connector includes means for storing calibration data unique to the sensor. A cable interconnects the sensor with the connector. The monitor includes means for polling the means for storing and for extracting the calibration data, and means for converting the signal provided by the sensor into a calibrated signal, the means for converting including means for applying the extracted calibration data to the signal provided by said sensor.

The means for storing typically includes a stored array of calibration constants unique to the sensor and the means for converting includes means for solving an equation wherein the calibrated signal is a function of the calibration constants and the sensor signal. Alternatively, the means for storing includes a stored look-up table interrelating physical parameter values with sensor signal values, and the means for converting including means for extracting a physical parameter value related to the signal value provided by the sensor.

This invention also features a self calibrating probe comprising a sensor for providing a signal relating to a physical parameter to be measured; a connector for interfacing the sensor with a monitor; a cable interconnecting the sensor with the connector; and means for storing calibration data unique to the sensor wherein the means for storing is located on the probe. The means for storing includes a memory device having calibration constants unique to the sensor stored therein or a look-up table relating sensor signal values with physical parameter values to be measured by the sensor.

This invention also features a method of manufacturing a self calibrating transducer type probe, the method comprising: connecting a probe to a computer; subjecting the probe to known physical conditions sensing the signal provided by the probe; determining the calibration data unique to the probe which corrects the probe signal to properly indicate the correct physical conditions; and storing the calibration data unique to the probe on the probe. Storing typically includes placing a memory device on the probe and programming the memory device to store the calibration data.

The measurement system of this invention also features a plurality of self calibrating probes each including: a sensor for providing a signal related to physical parameter, a connector for interfacing the sensor with a monitor, the connector including means for storing calibration data unique to the sensor, and a cable interconnecting the sensor with the connector. The monitor includes means for polling the means for storing and for extracting the calibration data, and means for converting the signal provided by the transducer into a calibrated signal. The means for converting includes means for applying the extracted calibration data to the signal provided by the sensor. The monitor may further include a multiplexer circuit for real time sampling of the probes, and a scheduling circuit for defining the sampling rate.

The gas flow and temperature probe of this invention includes sensor means for sensing the ambient gas cooling rate and temperature; a connector for interfacing the sensor with a monitor, the connector including means for storing calibration data unique to the sensor means; and an elongated, flexible cable interconnecting the sensor means with the connector. The sensor means typically includes two transducers: a thermistor and a temperature sensor.

The multipoint gas flow and temperature sensing system of this invention features a plurality of self calibrating probes, each probe including: sensor means for sensing the ambient gas cooling rate and temperature, a connector for interfacing the sensor means with a monitor, the connector including means for storing calibration data unique to the sensor means, and a cable interconnecting the sensor means with the connector. The monitor includes means for polling the means for storing and for extracting the calibration data, and means for converting the signal provided by said sensor means into a calibrated signal, the means for converting including means for applying the extracted calibration data to the signal provided by the sensor means.

DISCLOSURE OF PREFERRED EMBODIMENT

Other objects, features and advantages will occur to those skilled in the art from the following description of a preferred embodiment and the accompanying drawings, in which.

Figure 1:
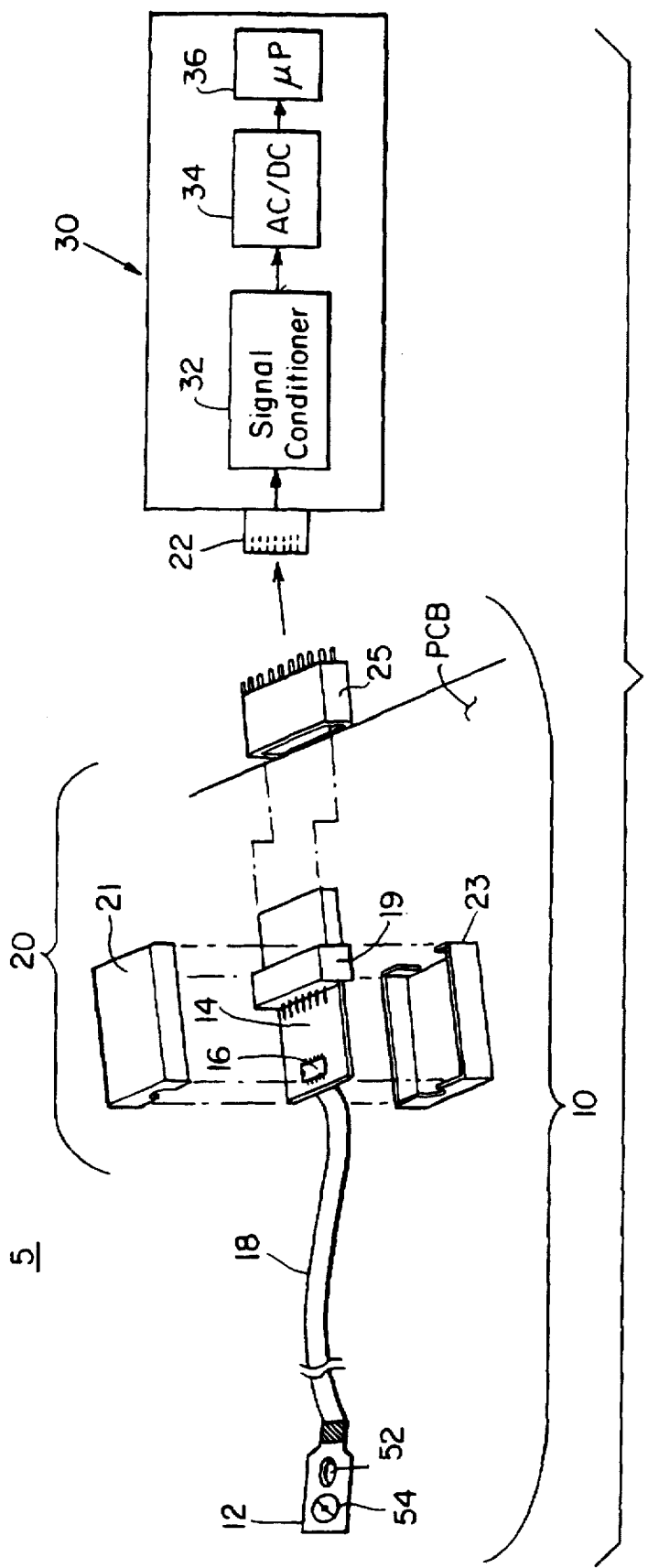
FIG. 1 is a schematic partially exploded view of the physical parameter measurement system of this invention.

Physical parameter measurement system 5, FIG. 1 includes one or more probes 10 each including one or more sensors 12 including transducers 52 and 54 for providing a signal relating to a physical parameter to be measured. For example, transducer 52 may be a thermistor and transducer 54 may be a temperature sensor. Sensor 12 is approximately 0.5 inches long as measured from left to right in FIG. 1, 0.2 inches wide as measured from top to bottom in FIG. 1, and approximately 0.03 inches thick as measured into the paper in FIG. 1. This small configuration allows probe 10, FIG. 1 to be inserted into the cabinet of an electronic system and between circuit boards and electronic components.

Sensor 12 is connected to connector 20 by cable 18. To provide easy access to locations between electronic circuit boards and components, cable 18, FIG. 1, may be a flat Teflon cable running as much as six feet or more in length and having a width of approximately 0.25 inch and the thickness of approximately 0.1 inch thereby allowing probe 10 to be installed easily, quickly, without special handling, drilling, or adjustment of the equipment being monitored. Connector 20 is plugged into monitor 30 at receptacle 22. Connector 20 includes circuit board 14 for storing calibration data unique to sensor 12. For example, circuit board 14 may include memory device 16 which includes the calibration constants unique to sensor 12 or, alternatively, a look-up table relating various transducer signal values to the corresponding physical parameters measured by the transducer. Connector 20 may be a 10 pin connector plug available from Hirose Electric, part no. 3240-10P-c. Connector 20 includes connector body 19, upper 21 and lower 23 housing members, and socket 25 (Hirose part no. 3260-1053).

Monitor 30 includes means 36 for converting the signal provided by transducer 12 into a calibrated signal. In this way, the calibration data unique to probe 10 is stored right on probe 10 rendering probe 10 interchangeable with respect to monitor 30 and with respect to other similar types monitors and probes thereby eliminating the need for the user to calibrate probe 10 each time it is used.

Figure 2:
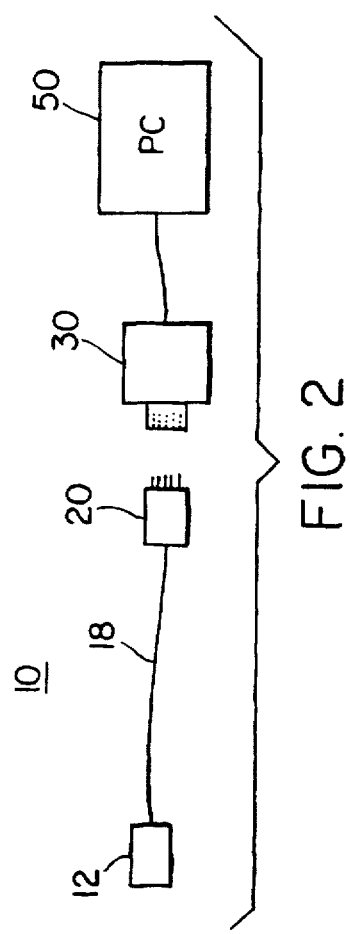
FIG. 2 is a schematic view depicting the apparatus according to this invention used to program the individual probes with their unique calibration data.
Figure 3:
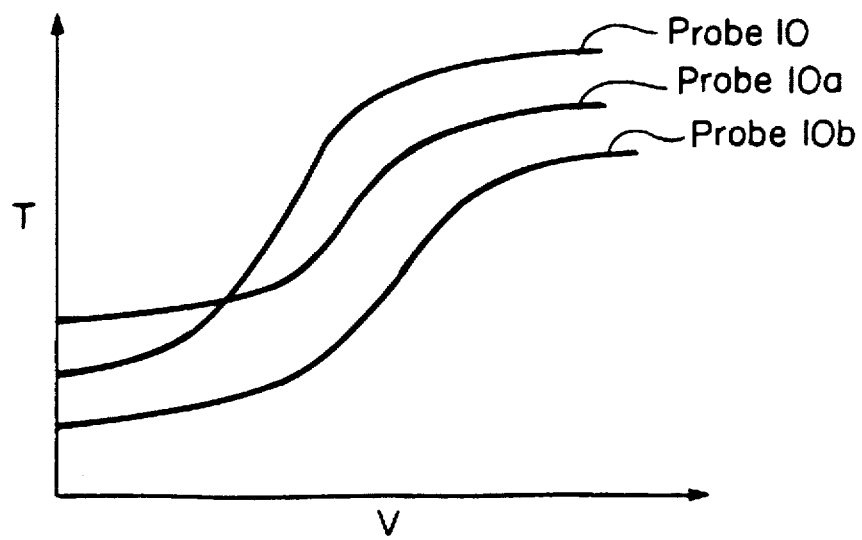
FIG. 3 is a chart showing the different calibration curves for three different probes.

Before distribution, probe 10 is manufactured to include memory device 16 which may be a Microchip Technology Model No. 93C46 potted on circuit board 14 of connector 20. Probe 10 is connected to computer 50, FIG. 2 and subjected to known conditions. If sensor 12 includes a thermistor, it would indicate a voltage level V, FIG. 3, when subject to a given temperature T as shown. Note that probe 10 may not respond the same as additional probes 10a and probe 10b as depicted by the T/V chart in FIG. 3, hence the need for calibration. The calibration data unique to probe 10 is transmitted by computer 50 to memory 16 in connector 20 of probe 10 and stored therein.

Then, in use, sensor 12, FIG. 1, delivers a particular voltage level through connector 20 and receptacle 22 of monitor 30 to be conditioned by signal conditioner 32 and converted to a d.c. voltage by converter 34. The resulting signal is analyzed by microprocessor 36 which, in addition, polls memory device 16 in connector 20 of probe 10 to obtain the calibration data for probe 10. Microprocessor 36 then applies the calibration data to the signal provided by sensor 12 to calibrate the signal. The calibration data stored on memory device 16 can be in the form of calibration constants unique to that probe. For example, if thermistor 52 provides a voltage V and temperature sensor 54 provides a temperature signal T, the calibration constants stored in memory 16 would be $K_0$, $K_1$, and $K_2$, so that microprocessor 36 could solve the equation:

$$\text{Flow rate} = (V^2 - K_0 - K_2 * T)/K_1)^2 \quad (1)$$

In another embodiment, memory device 16 includes a stored look-up table which relates transducer signal values to the parameter being measured by the transducer. In this embodiment, microprocessor 36 notes the transducer signal value, polls the look up table for the physical parameter value related to that transducer signal value, and outputs the appropriate physical parameter value. In accordance with the previous example, memory 16 would contain a table of flow rate values related to V and T values and microprocessor 36 would find and output the appropriate flow rate value related to the particular values of V and T transmitted by probe 10.

Figure 4:
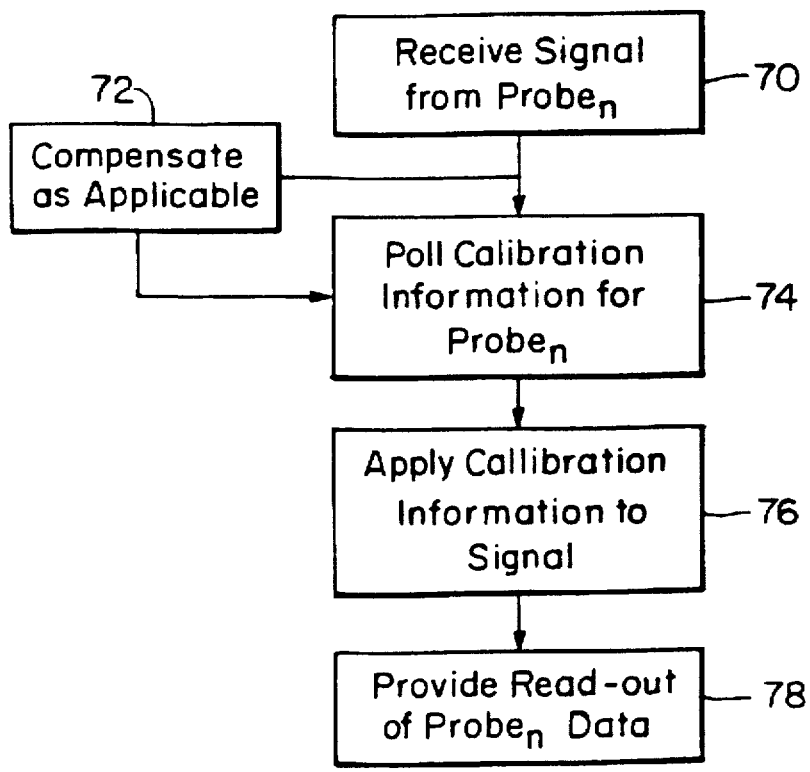
FIG. 4 is a flow chart depicting the operation of the operating system in the monitor of the physical parameter measurement system shown in FIG. 1.

The operation of the computer program operating on microprocessor 36, FIG. 1 is depicted in FIG. 4. Monitor 30 receives a signal from any probe compensated as applicable, step 72. Microprocessor 36, FIG. 1, then polls memory 16 of probe 10 for its unique calibration data, step 74, FIG. 4, and applies the calibration information to the probe signal, step 76. Monitor 30, FIG. 1, then provides an output including the calibrated information related to each probe, step 78, FIG. 4.

Figure 5:
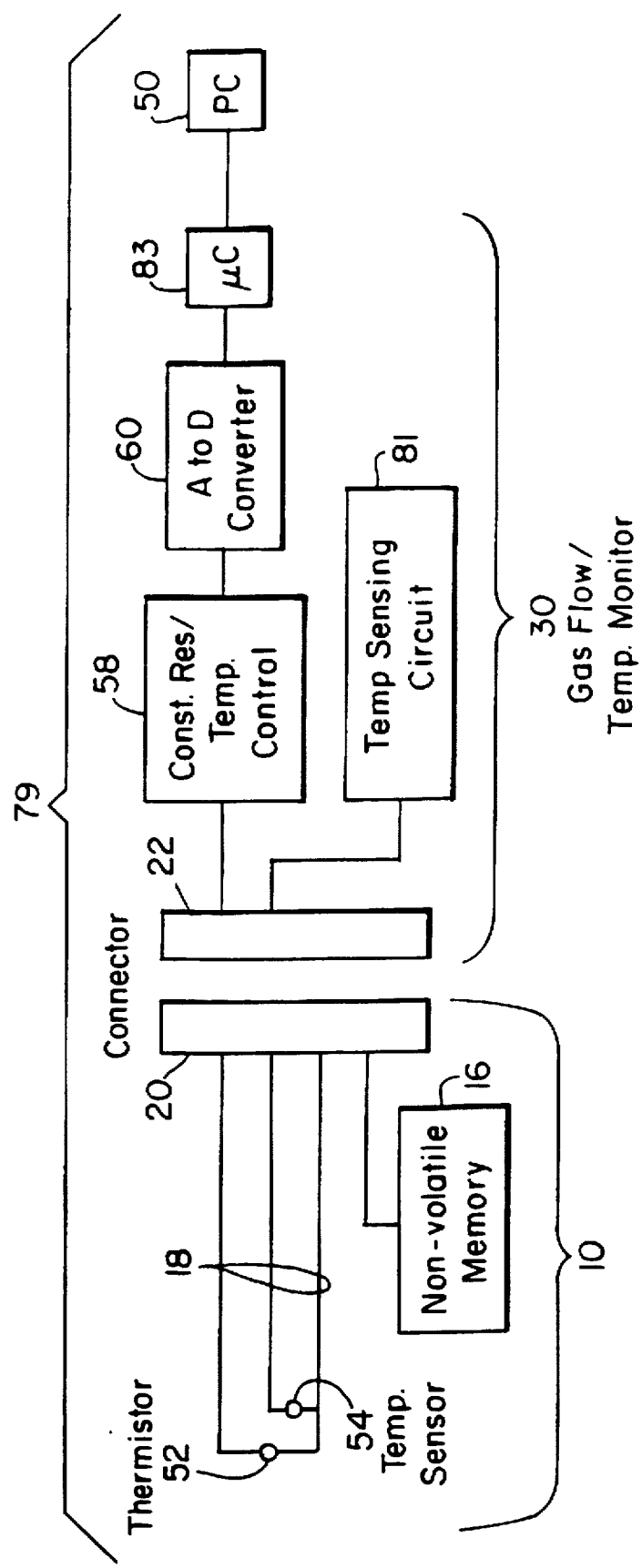
FIG. 5 is a schematic view of one embodiment the physical parameter measurement system shown in FIG. 1 for a gas flow and temperature monitoring system.

One application of the subject invention is gas flow and temperature sensing system 79, FIG. 5 used to monitor and study or characterize the air flow at different locations in an electronic system cabinet containing printed circuit boards to assure that the various components on the printed circuit boards are receiving the needed air flow for cooling. Probe 10, FIG. 5, is interconnected with gas flow and temperature monitor 30 and the output of gas flow and temperature monitor 30 may be connected to a conventional computer 50 such an IBM PC. Sensor 12 includes two transducers: thermistor 52 for sensing the cooling rate, and temperature sensor 54 for sensing the temperature of the air or other gas proximate sensor 12. The temperature signal sensed by sensor 54 is delivered over cable 18 to temperature sensing circuit 81 of monitor 30. The cooling rate signal from thermistor 52 is delivered to a constant resistance/temperature servo control circuit 58 which provides a signal to voltage-to-current converter 60 that is in turn delivered to processor 83. Stored in non-volatile memory 16 in connector 20 is the air flow calibration data for this particular probe 10. The calibration data is obtained by initially subjecting probe 10 to different known air flows and measuring the cooling rate voltage V and gas temperature T three times, and then using three simultaneous equations of the form shown of equation (1) above. By solving those equations for different known air flows, velocities and temperatures, the three calibration constants $K_0$, $K_1$, and $K_2$ can be determined for this particular probe. Then, in operation, with $K_0$, $K_1$ and $K_2$ known for this particular probe and stored in memory 16 on the probe, the temperature T being obtained from temperature sensor 54 and the cooling rate voltage V being obtained from thermistor 52, the actual air flow can be calculated by gas flow and temperature monitor circuit 30.

Figure 6:
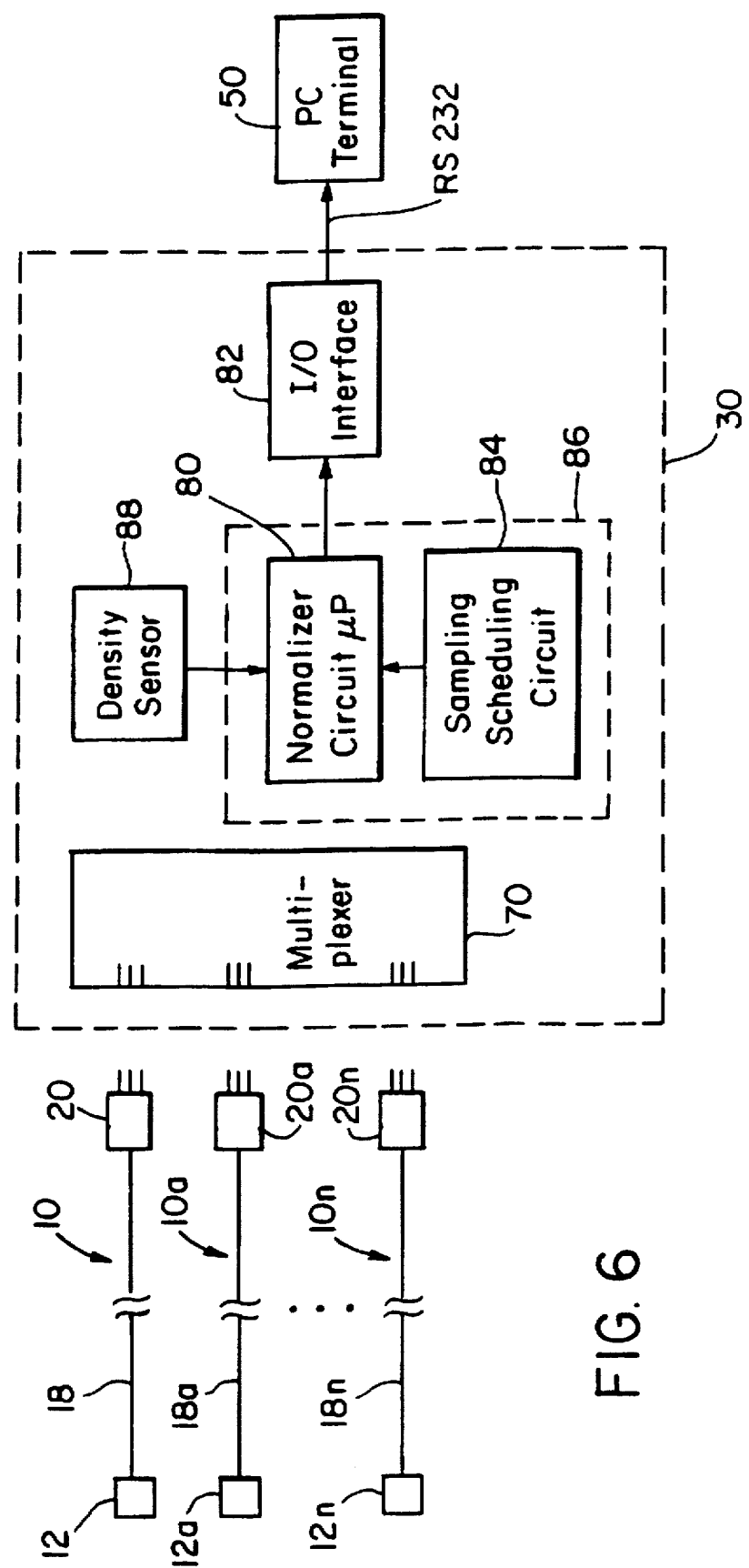
FIG. 6 is a schematic block diagram of a gas flow and temperature monitoring system in accordance with this invention with multiple interchangeable probes.

A multipoint air flow and temperature monitoring system according to this invention is shown in FIG. 6. Gas flow and temperature monitor 30 includes multiplexer 70 which has connected to it a plurality of probes 10, 10a, . . . $10_n$, . . . Multiplexer 70 provides real time sampling of probes 10, 10a . . . $10_n$. Normalizer circuit 80, which may utilize a conventional microprocessor, carries out the calculation for air flow set forth in equation (1) above utilizing the calibration data stored in the connectors 20, 20a, . . . $20_n$ of each probe and the temperature signals and cooling rate signals delivered by sensors 12, $12_a$, . . . and $12_n$. This output is provided through I/O interface 82 to conventional personal computer 50 which may implement a conventional microprocessor program to carry out the calculation of gas flow in accordance with equation (1) above. Sample scheduling circuit 84 which defines the sampling rate for multiplexer 70, may be implemented in the same microprocessor as normalizer circuit 80 as indicated by dashed 10 lines 86. A density sensor 88 for sensing the density of air or other gas being measured may be used to provide the ambient gas density which is rationed with the gas density of the air or other gas at mean sea level and multiplied times the air flow from equation (1) above to obtain the linear air velocity in accordance with equation (2):

Linear Air Velocity=Air Flow*(Density/measured Density @ MSL)     (2)

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A measurement system comprising:
a plurality of self calibrating probes each including:
a sensor for providing a signal related to a physical parameter to be measured,
a connector for interfacing said sensor with a monitor, said connector including means for storing calibration data unique to said sensor, and
means for interconnecting said sensor with said connector;
the monitor including:
means for polling said means for storing and for extracting said calibration data, and
means for converting the signal provided by the sensor into a calibrated signal, said means for converting including means for applying said extracted calibration data to said signal provided by said sensor.

2. The system of claim 1 in which said means for storing includes a stored array of calibration constants unique to said sensor and said means for converting includes means for solving an equation wherein the calibrated signal is a function of the calibration constants and the sensor signal.

3. The system of claim 1 in which said means for storing includes a stored look-up table interrelating physical parameter values with sensor signal values, said means for converting including means for extracting a physical parameter value related to the signal value provided by the sensor.

4. A measurement system comprising:
a plurality of self calibrating probes each including:
a sensor for providing a signal related to physical parameter,
a connector for interfacing said sensor with a monitor, said connector including means for storing calibration data unique to said sensor, and
a cable interconnecting said sensor with said connector;
the monitor including:
means for polling said means for storing and for extracting said calibration data, and
means for converting the signal provided by the transducer into a calibrated signal, said means for converting including means for applying said extracted calibration data to said signal provided by said sensor.

5. The system of claim 4 in which said monitor further includes a multiplexer circuit for real time sampling of said probes, and a scheduling circuit for defining the sampling rate.

6. A multipoint gas flow and temperature sensing system comprising:
- a plurality of self calibrating probes, each probe including:
  - sensor means for sensing the ambient gas cooling rate and temperature,
  - a connector for interfacing said sensor means with a monitor, said connector including means for storing calibration data unique to said sensor means, and
  - a cable interconnecting said sensor means with said connector;
- the monitor including:
  - means for polling said means for storing and for extracting said calibration data, and
  - means for converting the signal provided by said sensor means into a calibrated signal, said means for converting including means for applying said extracted calibration data to said signal provided by said sensor means.

* * * * *